Patented Dec. 13, 1949

2,490,800

UNITED STATES PATENT OFFICE 2,490,800

METHOD OF PREPARING ALIPHATIC PERACIDS AND SUBSTITUTION PRODUCTS THEREOF

Frank P. Greenspan, Buffalo, N. Y., assignor to Buffalo Electro-Chemical Company, Inc., Buffalo, N. Y., a corporation of New York No Drawing. Application August 5, 1947, Serial No. 766,474

17 Claims. (Cl. 260—502)

My invention relates to a method of preparing aliphatic peracids and substitution products thereof, such as halogenated derivatives.

It is the principal object of the present invention to provide a method of preparing aliphatic peracid solutions which is safe and easily controllable.

Another important object is to provide such a method which produces aliphatic peracid concentrations which heretofore were unattainable with practical processes.

Another object is to provide a highly efficient process in which peracid yields are close to theoretical.

Another object is to provide such a method which is simple and capable of being practiced on a commercial scale.

Another object is to provide such a method which produces anhydrous aliphatic peracids of relatively high concentration and substantially free of undesirable acyl peroxides.

A further object is to provide such a method which produces peracids substantially free of hydrogen peroxide.

In accordance with the present invention, aliphatic peracids of high concentration are produced from hydrogen peroxide in a reaction characterized by smoothness and exceptionally high peracid yields, over 95% of theoretical. The procedure used is distinguished by the absence of violent reactivity as well as the absence of undesirable by-product formation associated with conventional methods of peracid preparation. No extensive equipment or safeguards are necessary to carry out the invention on a commercial scale.

The present invention is practiced by reacting an aliphatic acid with hydrogen peroxide in the presence of a catalyst, and then slowly adding, with stirring, after an elapsed time, a calculated amount of acyl anhydride to the initial reaction mixture; this calculation being based upon the addition of 1 mole of acyl anhydride for each mole of hydrogen peroxide used and each mole of water initially added as reagent diluents. The reaction proceeds smoothly. During and following the addition of the calculated amount of acyl anhydride, it is preferred to maintain the mixture at 35°–40° C. by regulation of the rate of addition of acyl anhydride together with external cooling. This is readily accomplished.

While any concentration of hydrogen peroxide solution can be used as long as it reacts with the aliphatic acid to form the corresponding aliphatic peracid, it is desirable to employ an aqueous solution containing a minimum of 50% hydrogen peroxide. Any molar proportion of aliphatic acid to hydrogen peroxide can be used, although it is preferred to limit the ratio to 0.5–1.5 moles of aliphatic acid to 1 mole of hydrogen peroxide. Higher concentrations of aliphatic peracids can be produced with lower molar ratios of aliphatic acid to hydrogen peroxide.

The time of acyl anhydride addition is not critical and considerable latitude is permissible due to the rapidity of the reaction of hydrogen peroxide with acetic acid. Addition at any time gives substantially the same peracid formation. I prefer to add the anhydride at least one hour after the start of the reaction of the hydrogen peroxide and aliphatic acid. The acyl anhydride used need not be the anhydride of the aliphatic acid used. The use of a different anhydride will yield mixed aliphatic peracids.

If the reaction were allowed to proceed to equilibrium without acyl anhydride addition, there would be present some unreacted hydrogen peroxide. The acyl anhydride added reacts to form additional aliphatic peracid together with aliphatic acid.

I prefer to react the aliphatic acid with 90% hydrogen peroxide in the presence of 1% by weight of mineral acid, such as sulfuric acid, as catalyst, adding 1 mole of hydrogen peroxide to 1.5 moles of the aliphatic acid. At the end of one hour or longer, the calculated amount of acyl anhydride is slowly added, with stirring, to the reaction mixture, the addition being so regulated together with external cooling so as to maintain the temperature at 35°–40° C. At this temperature the reaction proceeds smoothly and quickly, yielding a concentrated peracid solution. The product is essentially an aliphatic peracid solution in aliphatic acid containing substantially no water, no hydrogen peroxide and no acyl peroxide.

Aliphatic peracids are useful oxidizing agents in organic reactions characterized by unusual reactivity with double bonds and an ability to split substituted benzene and napthalene rings. Aliphatic peracids are likewise efficient bleaching agents as well as catalysts in polymerization reactions. For many applications, such as epoxidation and hydroxylation of olefins, the use of anhydrous peracid in lieu of water solutions is desirable because of the increased solubility of reactants obtained, thereby resulting in increased reaction efficiency. Another example of the use of anhydrous aliphatic peracids is as a catalyst in bulk polymerization where water interferes because of lack of solubility in the monomer. Further, anhydrous peracids are of value for pharmaceutical preparations of dilute water-free solutions of peracids in non-aqueous solvents.

The following examples illustrate but do not limit the invention:

Example 1

1890 grams of an aqueous solution of 90% hydrogen peroxide were added rapidly to 4500 grams of glacial acetic acid in the presence of 63 grams of 97% sulfuric acid. At the end of one hour, 6343 grams of acetic anhydride (100% basis) were added slowly to this reaction mixture with the temperature maintained at 35°–40° C. by external cooling. The reaction proceeded smoothly and rapidly throughout. Peracetic acid yields averaged 95%–98% of theoretical. On analysis it was found that the water-free product contained 27% peracetic acid and no diacetyl peroxide. Less than 0.1% hydrogen peroxide was present.

Example 2

A similar procedure was followed using propionic acid. 37.8 grams of 90% hydrogen peroxide were added rapidly to 111 grams of propionic acid containing 1.5 grams of 97% sulfuric acid. After an elapsed time of four hours, 160 grams of propionic anhydride were added, with stirring, to the reaction mixture while maintaining the temperature at 35°–40° C. The resultant solution was allowed to stand overnight before analysis. The solution was found to contain 23.9% perpropionic acid and to be free of dipropionyl peroxide, water, and hydrogen peroxide. The yield of perpropionic acid was 95% of theoretical.

In the above tests hydrogen peroxide and peracid contents were determined by conventional methods. Total active oxygen was likewise determined by the sodium iodide-acetone method for organic peroxides.

From the foregoing it will be seen that the present method provides a simple, safe, efficient and readily practiced method of preparing relatively high concentration aliphatic peracids substantially free from acyl peroxide, water, and hydrogen peroxide.

It will be understood that the process is also applicable to substituted products of aliphatic peracids, such as halogenated derivatives. Thus, substituted aliphatic acids, such as hydroxy, chlor, brom acids can be reacted, in accordance with the present invention, with hydrogen peroxide and thereafter with the calculated amount of acyl anhydride to provide the corresponding peracids substantially free from acyl peroxide, water, and hydrogen peroxide. The term "aliphatic peracid" as used in the accompanying claims is therefore meant to include such substituted aliphatic peracids.

I claim:

1. The method of preparing aliphatic peracids and substituted aliphatic peracids, which comprises reacting an aliphatic acid with hydrogen peroxide, and thereafter adding acyl anhydride.

2. The method of preparing aliphatic peracids and substituted aliphatic peracids, which comprises reacting an aliphatic acid with hydrogen peroxide, and thereafter adding anhydride of the same aliphatic acid.

3. The method of preparing aliphatic peracids which comprises reacting an aliphatic acid with an aqueous solution of not substantially less than 50% hydrogen peroxide, and thereafter adding acyl anhydride.

4. The method of preparing aliphatic peracids which comprises reacting an aliphatic acid with an aqueous solution of not substantially less than 50% hydrogen peroxide, in the presence of a mineral acid catalyst, and thereafter adding acyl anhydride.

5. The method of preparing aliphatic peracids which comprises reacting an aliphatic acid with an aqueous solution of not substantially less than 50% hydrogen peroxide, in the presence of a mineral acid catalyst, allowing the reaction to proceed for a period of time in excess of about 1 hour, and thereafter slowly adding acyl anhydride.

6. The method of preparing aliphatic peracids which comprises reacting an aliphatic acid with an aqueous solution of not substantially less than 50% hydrogen peroxide, in the presence of a mineral acid catalyst, allowing the reaction to proceed for a period of time in excess of about 1 hour, and thereafter slowly adding anhydride of said aliphatic acid.

7. The method of preparing aliphatic peracids which comprises reacting an aliphatic acid with an aqueous solution of not substantially less than 50% hydrogen peroxide, in the presence of a mineral acid catalyst, allowing the reaction to proceed for a period of time in excess of about 1 hour, thereafter slowly adding acyl anhydride, and maintaining the temperature of the reaction after addition of the acyl anhydride approximately in the range of from 35°–40° C.

8. The method of preparing aliphatic peracids and substituted aliphatic peracids, which comprises reacting an aliphatic acid with hydrogen peroxide and thereafter adding acyl anhydride in the approximate molar proportion of 1 mole of acyl anhydride for each mole of hydrogen peroxide used and each mole of water present as reagent diluents.

9. The method of preparing aliphatic peracids and substituted aliphatic peracids, which comprises reacting an aliphatic acid with an aqueous solution of not substantially less than 50% hydrogen peroxide, and thereafter adding acyl anhydride in the approximate molar proportion of 1 mole of acyl anhydride for each mole of hydrogen peroxide used and each mole of water present as reagent diluents.

10. The method of preparing aliphatic peracids and substituted aliphatic peracids, which comprises reacting an aliphatic acid with an aqueous solution of not substantially less than 50% hydrogen peroxide, in the presence of a mineral acid catalyst, and thereafter adding acyl anhydride in the approximate molar proportion of 1 mole of acyl anhydride for each mole of hydrogen peroxide used and each mole of water present as reagent diluents.

11. The method of preparing aliphatic peracids and substituted aliphatic peracids, which comprises reacting an aliphatic acid with an aqueous solution of not substantially less than 50% hydrogen peroxide in the presence of a mineral acid catalyst, allowing the reaction to proceed for a period of time in excess of about 1 hour, and thereafter adding acyl anhydride in the approximate molar proportion of 1 mole of acyl anhydride for each mole of hydrogen peroxide used and each mole of water present as reagent diluents.

12. The method of preparing aliphatic peracids and substituted aliphatic peracids, which comprises reacting an aliphatic acid with an aqueous solution of not substantially less than 50% hydrogen peroxide, in the presence of a mineral acid catalyst, and thereafter adding anhydride of said aliphatic acid in the approximate molar proportion of 1 mole of said anhydride of said aliphatic acid for each mole of hydrogen peroxide used and each mole of water added as reactant impurities.

13. The method of preparing aliphatic peracids and substituted aliphatic peracids, which comprises reacting an aliphatic acid with an aqueous solution of not substantially less than 50% hydrogen peroxide, thereafter adding acyl anhydride in the approximate molar proportion of 1 mole of acyl anhydride for each mole of hydrogen peroxide used and each mole of water present as reagent diluents, and maintaining the temperature of the reaction after the addition of the acyl anhydride approximately in the range of from 35° to 40° C.

14. The method of preparing aliphatic peracids and substituted aliphatic peracids, which comprises reacting an aliphatic acid with an aqueous solution of not substantially less than 50% hydrogen peroxide in the presence of a mineral acid catalyst, allowing the reaction to proceed for a period of time in excess of about 1 hour, thereafter adding anhydride of said aliphatic acid in the approximate molar proportion of 1 mole of said anhydride of said aliphatic acid for each mole of hydrogen peroxide used and each mole of water present as reagent diluents, and maintaining the temperature of the reaction after the addition of said anhydride of said aliphatic acid in the approximate range of from 35° to 40° C.

15. The method of preparing aliphatic peracids and substituted aliphatic peracids which comprises reacting an aliphatic acid with an aqueous solution of not substantially less than 50% hydrogen peroxide in the molar proportion of from 0.5 to 1.5 moles of the former to 1 mole of the latter and in the presence of approximately 1% by weight of mineral acid, and thereafter adding acyl anhydride.

16. The method of preparing aliphatic peracids and substituted aliphatic peracids, which comprises reacting an aliphatic acid with an aqueous solution of not substantially less than 50% hydrogen peroxide in the molar proportion of from 0.5 to 1.5 moles of the former to 1 mole of the latter and in the presence of approximately 1% by weight of mineral acid, thereafter adding anhydride of said aliphatic acid in the approximate proportion of 1 mole of said anhydride of said aliphatic acid for each mole of hydrogen peroxide used and each mole of water present as reagent diluents, allowing the reaction to proceed for a period of time in excess of about 1 hour, and maintaining the temperature of the reaction after the addition of said anhydride of said aliphatic acid in the approximate range of from 35° to 40° C.

17. The method of preparing peracetic acid which comprises reacting glacial acetic acid with an aqueous solution of not substantially less than 50% hydrogen peroxide in the presence of approximately 1% by weight of sulfuric acid as a catalyst, allowing the reaction to proceed for a period of time in excess of about 1 hour, thereafter adding acetic anhydride in the approximate molar proportion of 1 mole of acetic anhydride for each mole of hydrogen peroxide used and each mole of water present, as reagent diluents, and maintaining the temperature of the reaction after addition of the acetic anhydride in the approximate range of from 35° to 40° C.

FRANK P. GREENSPAN.

REFERENCES CITED

The following references are of record in the file of this patent:

UNITED STATES PATENTS

| Number | Name | Date |
|---|---|---|
| 2,284,477 | Reichert et al. | May 26, 1942 |
| 2,377,038 | Reichert et al. | May 29, 1945 |

OTHER REFERENCES

Greenspan, Jour. Am. Chem. Soc., vol. 68, page 907 (1946).